United States Patent [19]

Lund et al.

[11] Patent Number: 4,786,689
[45] Date of Patent: Nov. 22, 1988

[54] PROCESS FOR METALLATING NONCONJUGATED DIENE-CONTAINING ETHYLENE POLYMERS AND GRAFT POLYMERS PREPARED THEREFROM

[75] Inventors: Gary K. Lund, Ogden, Utah; Raymond L. Laakso, Jr., St. Francisville, La.; Calvin P. Esneault; Brian W. Walther, both of Baton Rouge, La.

[73] Assignee: The Dow Chemical Company, Midland, Mich.

[21] Appl. No.: 109,331

[22] Filed: Oct. 16, 1987

Related U.S. Application Data

[60] Division of Ser. No. 899,183, Aug. 18, 1986, Pat. No. 4,761,456, which is a continuation-in-part of Ser. No. 745,763, Jun. 16, 1985, abandoned.

[51] Int. Cl.$^4$ .................. C08F 255/06; C08F 8/00
[52] U.S. Cl. .................... 525/250; 525/258; 525/259; 525/315; 525/324; 525/331.7; 525/361; 525/366; 525/382
[58] Field of Search .............. 525/361, 366, 331.7, 525/382, 250, 259

[56] References Cited

U.S. PATENT DOCUMENTS

| 3,313,786 | 4/1967 | Kahle et al. ...................... 260/79.5 |
| 3,435,096 | 3/1969 | Limbert et al. ...................... 260/878 |
| 3,451,988 | 6/1969 | Langer, Jr. .......................... 260/94.6 |
| 3,489,822 | 1/1970 | Witt et al. ............................ 260/878 |
| 3,492,369 | 1/1970 | Naylor ................................ 260/879 |
| 3,598,793 | 8/1971 | Koch .............................. 260/79.5 B |
| 3,627,837 | 12/1971 | Webb ................................ 260/836 |
| 3,642,950 | 2/1972 | O'Shea .............................. 260/878 |
| 3,703,566 | 11/1972 | Duck et al. ...................... 260/878 R |
| 3,794,697 | 2/1974 | Bronstert et al. ................ 260/876 R |
| 3,832,423 | 8/1974 | Milkovich et al. ............. 260/878 R |
| 3,879,358 | 4/1975 | Lachowicz et al. ............. 260/80.78 |
| 3,886,233 | 5/1975 | Vissern ........................... 260/878 R |
| 3,897,405 | 7/1975 | Son et al. ..................... 260/79.5 NV |
| 3,976,628 | 8/1976 | Halasa et al. ....................... 526/22 |
| 3,984,496 | 10/1976 | Morimoto et al. ............. 260/878 R |
| 4,078,019 | 3/1978 | Langer, Jr. ...................... 260/880 R |
| 4,412,896 | 11/1983 | Lemattre et al. ................ 240/159.2 |
| 4,707,521 | 11/1987 | Esneault et al. .................... 525/250 |

FOREIGN PATENT DOCUMENTS 48-100492 12/1973 Japan .

OTHER PUBLICATIONS

A. J. Amass et al., "Anionic Graft Copolymerization of Ethylene-Propylene Terpolymers", European Polymer Journal, vol. 8, pp. 781-787, (1972).
M. Schlosser et al., "The 'Super-Basic' Butyllithium Tert-Butoxide Mixture and Other Lickor-Reagents", Tetrahedron Letters, vol. 25, No. 7, pp. 741-744, (1984).
A. Peterlin et al., ed., "Monomers Polymerized by Anionic Initators", Macromolecular Reviews, vol. 2, pp. 74-83, (1967).
J. McGrath, ed., Anionic Polymerization, ACS Symposium Series 166, p. 60, 1981.

Primary Examiner—Wilbert J. Briggs, Sr.
Attorney, Agent, or Firm—D. R. Howard

[57] ABSTRACT

A process is provided for metallating ethylene polymers which have polymerized therein a minor amount of nonconjugated diene. Metallation is accomplished with a blend of three metallating reagents: (a) an alkyllithium compound; (b) a potassium alkoxide; and (c) a chelating tertiary diamine. The metallated polymers so prepared may be reacted with one or more anionically polymerizable monomers to form graft polymers or with a reagent such as carbon dioxide to form a functionalized polymer. When the anionically polymerizable monomer has two or more polymerizable sites, the metallated polymer is reacted with a modifying compound such as alpha-methylstyrene before it is reacted with the monomer(s). Certain of the graft polymers behave as thermoplastic elastomers whereas others are thermoplastic. The blend of metallating reagents may be used with any polymer having partial or complete unsaturation.

15 Claims, 2 Drawing Sheets

PROCESS FOR METALLATING NONCONJUGATED DIENE-CONTAINING ETHYLENE POLYMERS AND GRAFT POLYMERS PREPARED THEREFROM

CROSS REFERENCE TO RELATED APPLICATION

This is a divisional of application Ser. No. 899,183, filed Aug. 18, 1986, now U.S. Pat. No. 4,761,456, which is a continuation-in-part of application Ser. No. 745,763, filed June 16, 1985, now abandoned.

BACKGROUND OF THE INVENTION

The present invention relates generally to metallating ethylene polymers which have polymerized therein a minor amount of at least one nonconjugated diene. More specifically, the present invention relates to an improved process for metallating such polymers with a three-component metallation system. The present invention also relates to graft polymers and functionalized polymers prepared from the metallated polymers.

The term "metallation", used in its broadest sense, describes a substitution reaction in which a non-carbon atom is replaced by an alkali metal atom. In a narrower sense, it is believed that metallation of unsaturated polymers occurs by allyl hydrogen exchange whereby an anion is produced. The resulting anion is stabilized by delocalization with the adjacent double bond. The alkali metal atom is suitably provided by an organo-alkali metal compound.

Metallation of conjugated diene polymers with an organolithium compound, e.g., n-butyllithium, in combination with either a potassium alkoxide e.g., potassium-tert-butoxide or potassium-tert-amyloxide, or a tertiary diamine, e.g., tetramethylethylenediamine (hereinafter "TMEDA"), is known. See, A. F. Halasa et al., "Metallation of Unsaturated Polymers by Using Activated Organolithium Compounds and the Formation of Graft Polymers II", *Journal of Polymer Science*, Volume 14, pages 497–506 (1976). Halasa et al. note that each combination has one or more significant drawbacks. The n-butyllithium/TMEDA combination, while generally efficient for metallation of conjugated diene polymers such as polybutadiene, promotes polymer chain scission or degradation where there is a double bond in the polymer backbone. The n-butyllithium/potassium-tert-butoxide combination, when compared with the n-butyllithium/TMEDA combination, alleviates some of the chain scission problem but at a cost of lower metallation efficiency.

E. W. Duck et al., in U.S. Pat. No. 3,703,566, disclose metallation of unsaturated hydrocarbon elastomers and formation of graft copolymers by polymerizing one or more monomers in the presence of the metallated elastomer. The elastomer, more commonly known as an "EPDM terpolymer", has polymerized therein ethylene, a 1-olefin such as propylene and a nonconjugated diene monomer. Metallation is accomplished by admixing a solution of the terpolymer in an inert organic solvent with a complex of a saturated alkali metal hydrocarbon and a polar compound. The alkali metal hydrocarbon may be an alkyllithium compound such as n-butyllithium. The polar compound may be a tertiary diamine, such as tetramethylethylenediamine, or an alkali metal alkoxide, such as potassium-tert-butoxide. In other words, Duck et al., like Halasa et al., use a two-component metallation composition.

Polymer chain scission and low metallation efficiency are both undesirable. Polymer chain scission, or breaking up the polymer backbone, generally results in reduction of desirable polymer properties. Low metallation efficiency means excess metallating components may be present upon completion of metallation. Excess metallating components compete with the metallated ethylene polymer for reagents added subsequent to metallation. This competition provides a mixture of products rather than a generally pure product. Free alkali metal atoms (those not bound to the ethylene polymer) usually must be neutralized before use of the metallated polymer. The neutralized alkali metal atoms may adversely affect final product properties. Alkyllithium and potassium alkoxide compounds are also expensive. As such, final product cost escalates with increasing amounts of one or more of these compounds.

A metallating composition which provides enhanced metallation efficiency would be desirable. A metallated polymer with enough alkali metal sites to promote adequate functionalization or grafting of the polymer and thereby yield a useful polymer product would also be desirable. A metallated ethylene polymer suitable for use in preparing a thermoplastic elastomer would further be desirable. Graft polymers having either themoplastic or thermoplastic elastomer properties would similarly be desirable.

SUMMARY OF THE INVENTION

In one aspect, the present invention is a process for metallating an ethylene interpolymer, said interpolymer having polymerized therein ethylene, a nonconjugated diene and at least one 1-olefin having three or more carbon atoms, the process comprising: (a) providing an admixture of the ethylene interpolymer and a saturated nonpolar hydrocarbon solvent; (b) forming an intermixture of the admixture and activating amounts of a tertiary diamine and a potassium alkoxide; and (c) contacting the intermixture with an amount of at least one lithium akyl compound under conditions sufficient to provide more than about twenty percent of the polymer molecules with at least one lithiated site, the amounts of the tertiary amine, the potassium alkoxide and the lithium alkyl also being sufficient to provide a degree of metallation greater than the degree of metallation attained with (1) the potassium alkoxide and the lithium alkyl compound, or (2) the tertiary amine and the lithium alkyl compound, or by adding the degrees of metallation attained with (1) and (2). The lithiated ethylene polymer is a reaction intermediate which may be functionalized by reaction with suitable reagents or used as an anionic polymerization initiator. If desired, the lithium alkyl compound may be added before the tertiary amine and the potassium alkoxide without adverse effects.

In a second aspect, the present invention is a process for preparing a graft polymer having an ethylene polymer backbone and a plurality of side chains, the process comprising: (a) metallating an ethylene polymer, said polymer having polymerized therein ethylene, a nonconjugated diene and at least one 1-olefin having three or more carbon atoms by a process which comprises: (1) providing an admixture of the ethylene polymer and a saturated, nonpolar, hydrocarbon solvent, (2) forming an intermixture of the admixture and activating amounts of a tertiary amine and a potassium alkoxide, and (3)

contacting the intermixture with an amount of at least one lithium alkyl compound under conditions sufficient to provide more than about twenty percent of the polymer molecules with at least one lithiated site; and (b) contacting the metallated ethylene polymer with a reagent selected from the group consisting of compounds having sufficient electrophilic character to react with the metallated ethylene polymer which is nucleophilic. If more than one reagent is used, they may be added either sequentially or simultaneously. In addition, steps (2) and (3) may be reversed without adverse effects.

In a third aspect, the present invention is a graft copolymer which exhibits thermoplastic elastomer properties, said graft copolymer comprising an ethylene polymer backbone with at least two pendant polymer chains, the ethylene polymer having polymerized therein ethylene, a nonconjugated diene and at least one 1-olefin having three or more carbon atoms, the pendant polymer chains (a) having a number average molecular weight of from about 500 to about 100,000, (b) being formed by polymerizing at least one monomer selected from the group consisting of anionically polymerizable monomers which, after polymerization, form heterogeneous domains when two or more of such pendant chains are proximate to each other, and (c) comprising from about 10 to about 60 percent by weight based on copolymer weight.

Beneficially, at least about fifty percent of the polymer molecules have two or more pendant polymer chains attached thereto.

In a fourth aspect, the present invention is a process for preparing a graft polymer having an ethylene polymer backbone and a plurality of side chains which comprises: (a) providing a metallated ethylene polymer; (b) contacting the metallated polymer with a modifying compound under reactive conditions to form a modified polymer; and (c) contacting the modified polymer with at least one reagent selected from the group consisting of compounds having sufficient electrophilicity to react with the modified polymer under reactive conditions sufficient to form the graft polymer. If more than one reagent is used, they may be added either sequentially or simultaneously.

The metallated polymer, if in the form of a generally homogeneous solution, is desirably diluted with about 10% by volume or more of a polar solvent before adding the modifying compound. The polar solvent may, however, be added either simultaneously with, or subsequent to, the modifying compound provided addition is complete before contacting the modified polymer with one or more reagents. The solvent must be substantially nonreactive with the modifying compound and the metallated polymer, both before and after modification. The metallated ethylene polymer is nucleophilic even after modification.

The metallated polymers suitable for use in the fourth aspect of the present invention are desirably prepared in accordance with the process of the first aspect of the present invention. Satisfactory results are obtained, however, when other processes, such as those described by Duck et al. or Halasa et al., are used to prepare the metallated polymer.

In a fifth aspect, the present invention is a graft copolymer having thermoplastic properties and comprising a preformed ethylene polymer backbone having randomly attached thereto at least two pendant polymer chains, the pendant polymer chains comprising from about 10 to about 60 percent by weight, based on copolymer weight, and having (a) a number average molecular weight of from about 500 to about 100,000 (b) polymerized therein at least one moiety of a modifying compound, the moiety being connected to the preformed polymeer backbone, and at least one monomer selected from the group consisting of anionically polymerizable monomers.

The aforementioned graft copolymers have a structure similar to conventional linear triblock or radial multiblock polymers. Beneficially, at least about fifty percent of the polymer molecules have two or more pendant polymer chains attached thereto by way of at least one moiety of a modifying compound.

In a sixth aspect, the present invention is a three-component metallating composition which comprises a tertiary amine, a potassium alkoxide and at least one lithium alkyl, the components being present in amounts sufficient to provide a molar ratio of tertiary amine to lithium atom of from about 0.2 to about 5 and a molar ratio of potassium atoms to lithium atoms of greater than about 0.5. The ratio of potassium atoms to lithium atoms is beneficially greater than about 1, desirably from about 1 to about 4. The metallating composition is suitable for metallation of polymers containing varying degrees of unsaturation. The composition is particularly suitable for metallating copolymers of ethylene and a nonconjugated diene and interpolymers of ethylene, a nonconjugated diene and at least one 1-olefin having three or more carbon atoms.

The present invention also relates to the metallated ethylene polymers prepared as herein described.

BRIEF DESCRIPTION OF THE DRAWINGS

FIGS. 1 and 2 are graphic portrayals of the data presented in Table I. Table I is a compilation of metallation trials for Examples 1-6 and Comparative Examples A-T. The vertical axis represents percent of diene metallated (also referred to as "percent ene conversion."). The horizontal axis represents the molar ratio of potassium (K) atoms to lithium (Li) atoms in the metallating reagents (FIG. 1) or the molar ratio of tetramethylethylenediamine (TMEDA) to lithium atoms in the metallating reagents (FIG. 2). In FIG. 1, Curve A represents a molar ratio of TMEDA/Li of 0.0, Curve A' is an algebraic addition of the curve in FIG. 2 and Curve A; Curve B represents a molar ratio of TMEDA/Li of 0.5; and Curve C represents a molar ratio of TMEDA/Li of 1.0.

DESCRIPTION OF THE PREFERRED EMBODIMENTS

Suitable ethylene polymers include ethylene/nonconjugated diene copolymers and interpolymers of a nonconjugated diene, ethylene and at least one mono-olefin having a single terminal ethylenic group and three or more carbon atoms. The copolymers beneficially have polymerized therein, based upon copolymer weight, from about 90 to about 99.9 percent ethylene and from about one-tenth to about ten percent nonconjugated diene. The copolymers desirably have polymerized therein from about one to about six percent nonconjugated diene and from about 94 to about 99 percent ethylene. Useful interpolymers have polymerized therein, on a polymer weight basis, from about 15 to about 99.5 percent ethylene, from about 0 to about 85 percent mono-olefin other than ethylene and from about 0.5 to about 10 percent nonconjugated diene. The interpolymers beneficially have polymerized therein, on a polymer weight basis, from about 40 to about 80 percent ethylene and from about 1 to about 8 percent nonconjugated diene, with the balance comprising the other mono-olefin(s).

The mono-olefins (1-olefins) beneficially have from three to about twenty carbon atoms. Desirable 1-olefins contain from three to ten carbon atoms. Preferred 1-olefins include propylene, butene-1, hexene-1 and octene-1.

The nonconjugated dienes are selected from the group consisting of straight or branched chain diolefins, cyclic diolefins and bicyclic diolefins. The straight or branched chain nonconjugated diolefins beneficially have from five to about twenty carbon atoms. The straight or branched chain nonconjugated dienes desirably have from five to about ten carbon atoms.

The straight or branched chain nonconjugated diolefins include those in which both double bonds are terminal as well as those in which only one double bond is terminal. Straight or branched chain nonconjugated dienes wherein both double bonds are terminal include 2-methyl-1,5-hexadiene, 3,3-dimethyl-1,5-hexadiene, 1,6-heptadiene, 1,7-octadiene, 1,8-nonadiene, 1,9-decadiene, 1,19-eicosadiene and the like. Straight or branched chain diolefins wherein only one double bond is terminal include 1,4-hexadiene, 1,4-heptadiene, 1,5-heptadiene and the like.

The cyclic nonconjugated diolefins suitably have from about five to about twenty carbons. Illustrative cyclic diolefins include cyclohexadiene, cycloheptadiene, cyclooctadiene and the like.

The bicyclic nonconjugated dienes suitably have from about ten to about thirty carbon atoms. Typical bicyclic, or bridged ring, diolefins include dicyclopentadiene, ethylident norbornene, norbornadiene and the like.

The nonconjugated diene is desirably selected from the group consisting of 1,4-hexadiene and ethylidenenorbornene.

Methods of preparing EPDM polymers are disclosed in a number of United States patents. A partial listing of such patents includes U.S. Pat. Nos. 2,933,480; 3,000,866; 3,063,973; 3,093,621; 3,260,708; 3,280,082; and 3,310,537. The teachings of these patents are incorporated herein by reference.

Copolymers of ethylene and at least one nonconjugated diene monomer are readily prepared under slurry conditions via Ziegler catalysis. Slurry conditions and suitable catalysts are generally the same as those used in polymerization of ethylene. Differences, if any, are readily determined without undue experimentation.

Metallation occurs readily when the ethylene polymer is in solution. Metallation will also occur when the ethylene polymer is dispersed in a solvent as a slurry of finely-divided particles if the particles are adequately wetted with the solvent. The solvents are beneficially nonpolar, saturated hydrocarbons which solvate, but do not react with, the ethylene polymer, either before or after metallation, or with materials used to metallate the ethylene polymer. The solvent is desirably free of moisture, air and any impurities which might react with metallation reagents. Preferred solvents for the ethylene polymer are saturated hydrocarbons having from about 5 to about 10 carbon atoms, such as hexane and cyclohexane.

Useful tertiary diamines have three saturated aliphatic hydrocarbon groups attached to each nitrogen and include, for example, (a) chelating tertiary diamines, (b) cyclic diamines and (c) bridgehead diamines.

The chelating tertiary diamines are desirably represented by the formula $R'R''N-C_xH_{2x}-NR'''R''''$ where each R can be a straight- or branched-chain alkyl group of any chain length containing up to 20 carbon atoms or more, all of which are included herein, and x can be any whole number from 2 to 10. The ethylene diamines in which all alkyl substituents are the same are of particular interest. The latter include, for example tetramethylethylenediamine, tetraethylethylenediamine, tetradecylethylenediamine and the like. Cyclic diamines include tetralkyl 1,2-diamino cyclohexanes, tetralkyl 1,4-diamino cyclohexanes, piperazine, N,N'-dimethylpiperazine and the like. Bridgehead diamines include sparteine, triethylenediamine and the like.

Tertiary monoamines such as triethylamine are generally not very effective in this reaction. However, bridgehead monoamines such as 1-azo(2,2,2)bicyclooctane and its substituted homologs such as the 4-methyl and 4-ethyl substituted derivatives thereof are quite effective.

The potassium alkoxides include alkyl and aryl alkoxides having up to about 20 carbon atoms in which potassium is bound to a hetero atom. Suitable alkoxides include potassium methoxide, potassium ethoxide, potassium butoxides such as potassium-tert-butoxide, potassium phenoxide, potassium-tert-amyloxide (also known as potassium-tert-amylate), potassium naphthoxide and the like. The potassium alkoxide is desirably either potassium-tert-butoxide or potassium-tert-amyloxide.

The lithium alkyl compounds are represented by the general formula $RLi_x$, wherein R is (a) a saturated hydrocarbon radical which usually contains no more than 20 carbon atoms; (b) an aromatic radical such as phenyl, naphthyl, tolyl, methyl-naphthyl and the like; or (c) a saturated cyclic hydrocarbon radical having, for example, from five to seven carbon atoms. In addition, R can be a mono-unsaturated cyclic hydrocarbon radical having, for example, from five to seven carbon atoms, an unconjugated unsaturated aliphatic radical of one to twenty carbon atoms or an alkyllithium compound having one or more aromatic groups on the alkyl group. In the general formula, $x = 1$ to 3. Representative compounds of the formula $RLi_x$ include, for example:

methyllithium
i-propyllithium
sec-butyllithium
n-butyllithium
t-butyllithium
n-dodecyllithium
phenyllithium
4-phenylbutyllithium
4-butyl-cyclohexyllithium
alpha- and beta-naphthyllithiums
any biphenyllithium
styryllithium
benzyllithium
indanyllithium
1-lithio-3-butene
1-lithio-cyclohexene-3
1-lithio-cyclohexene-2
1,4-dilithiobutane
1,4-dilithiobenzene
1,3,5-trilithiopentane
1,3,5-trilithiobenzene Lithium adducts of polynuclear aromatic hydrocarbons, as described in U.S. Pat. No. 3,170,903, can also be employed. Illustrative polynuclear aromatic compounds include biphenyl, naphthalene, anthracene and stilbene.

Surprisingly, primary and secondary alkyllithium compounds in which the alkyl group is branched or cyclic (hereinafter "branched alkyllithium compounds") are generally more effective, in terms of metallation efficiency, than alkyllithium compounds in which the alkyl group is linear. The branched alkyllithium compounds may be used singly, in admixture with other branched alkyllithium compounds or in admixture with linear alkyllithium compounds. Selection of a particular branched alkyllithium compound, or admixture thereof with other alkyllithium compounds, depends upon factors such as cost, efficiency, availability and the like. Suitable branched alkyllithium compounds have five or more carbon atoms per alkyl moiety. Desirable branched alkyllithium compounds include 3,3-dimethylbutyllithium, 3,3-dimethylpentyllithium, methyllithium and neopentyllithium.

The tertiary diamine, the potassium alkoxide and the lithium alkyl are present in amounts sufficient to provide a molar ratio of tertiary diamine to lithium atom of from about 0.2 to about 5 and a molar ratio of potassium atoms to lithium atoms of greater than about 0.5, beneficially greater than about 1. The molar ratio of potassium atoms to lithium atoms is desirably from about 1 to about 4.0, preferably from about 1.0 to about 3.7. The combined amounts of potassium alkoxide, lithium alkyl and tertiary diamine are also sufficient to provide a degree of metallation (percent ene conversion) which exceeds that provided by (a) the potassium alkoxide and the lithium alkyl or (b) the tertiary diamine and the lithium alkyl. The degree of metallation from the combined amounts also exceeds the sum of (a) and (b).

The polar solvents are suitably Lewis bases such as ethers and amines. Illustrative Lewis bases include tetrahydrofuran, 2-methyl-tetrahydrofuran, 2,5-dimethyl-tetrahydrofuran, diethyl ether, triethyl phosphine, triethylamine, dimethyl ether, ethyl methyl ether, ethylene glycol dimethyl ether (glyme), diethylene glycol dimethyl ether (diglyme). The polar solvent is desirably tetrahydrofuran, ethylene glycol dimethyl ether or diethylene glycol dimethyl ether.

Metallation of ethylene polymers, in accordance with the present invention, is accomplished in a process which comprises three steps: first, providing a admixture of the ethylene polymer and a saturated nonpolar hydrocarbon solvent; second, forming an intermixture of the admixture and activating amounts of a tertiary diamine and a potassium alkoxide; and third, contacting the intermixture with an amount of at least one lithium alkyl (also referred to as "alkyllithium") compound under conditions sufficient to provide a lithiated polymer. The admixture may be prepared in advance or mixed in situ. The tertiary diamine and the potassium alkoxide may be added either separately or as a combination. In the event they are added separately, the order of addition is unimportant. The second and third steps may be reversed without adverse effect upon the resultant metallated ethylene polymer.

The amount of alkyllithium compound is sufficient to provide more than about twenty percent of the polymer molecules with at least one lithiated site. The amount can be increased to provide up to about ninety percent and more of the molecules with at least one lithiated site. The amount will vary depending upon a number of factors, one of which is degree of functionalization required for a given end use. Reducing the amount to provide less than twenty percent of the molecules with at least one lithiated site, while possible, is believed to be impractical due to insufficient polymer property modification.

Metallation is carried out at a temperature of from about 10° Centigrade to about 90° Centigrade. The temperature is beneficially from about 20° Centigrade to about 50° Centigrade. Higher temperatures are normally undesirable since side reactions, polymer degradation and decomposition of the alkyllithium compounds are likely to occur.

Although the amount of lithium alkyl compound may be varied, two points are noteworthy. First, excess lithium alkyl compounds will compete with the metallated polymer for anionically polymerizable monomers or other reagents which are added to the metallated polymer to prepare a grafted or functionalized ethylene polymer. The polymerizable monomers will react with excess lithium alkyl compounds to form homopolymer if only one monomer is added, interpolymers if two or more monomers are added, or other reaction products depending upon the nature and amount of reagents. If interpenetrating networks or mixtures of polymers are either acceptable or desirable, elimination of excess lithium alkyl compounds is unnecessary. If interpenetrating networks or mixtures are not desired, care should be taken to avoid such an excess. Second, an insufficient amount of lithium alkyl will not provide desirable ethylene polymer property modification via grafting.

The nonpolar hydrocarbon solvent is desirably free of impurities which will react with metallating reagents. Small levels of impurities may be "blanked" with a lithium alkyl compound before starting the second step of the metallation procedure set forth herein. This is done to minimize reaction with the ethylene polymer's double bonds. These double bonds are, in general, substantially unaffected by lithium alkyls without other reagents being present.

The term "blanking", as used herein, denotes a procedure wherein a precise amount of active reagent is added to react with the impurities to render them chemically inactive. In a typical procedure, an aliquot of the solvent or admixture is mixed with a compound which will show a perceivable change, e.g., a color change, upon addition of the active reagent. Diphenylethylene, when added to the solvent or admixture, will color the solvent or admixture yellow when active carbanions are present. The solvent or admixture will be colorless in the absence of active carbanions. Titration of the diphenylethylene-containing solvent or admixture with an active reagent, such as n-butyllithium, allows calculation of the precise molar amount of active reagent needed to neutralize the reactive impurities.

Preparation of graft polymers suitably follows metallation of the ethylene polymer. The metallated ethylene polymer may, as noted herein, be in the form of (a) a slurry of wetted particles or (b) a homogeneous mixture. Procedures used in grafting will vary depending upon the form in which the metallated polymer is available.

If the metallated polymer is in the form of a homogeneous mixture, grafting may be accomplished without recovery of the metallated polymer from the solvent and reagents used in preparing the metallated polymer. Grafting comprises two steps: first, diluting the metallated polymer solution with a polar solvent which is substantially nonreactive with the metallated polymer;

and second, blending at lest one reagent with the metallated polymer solution under reactive conditions. If viscosity of the metallated polymer solution is so high that dispersion of the reagent(s) therein is difficult, if not impossible, then the order of the steps must be as stated. If the viscosity of the metallated polymer solution is sufficiently low to provide for adequate dispersion of the reagent(s) therein, the steps may be reversed without adverse results.

Polar solvents are generally more effective than nonpolar solvents in terms of reducing mixture viscosity. The polar solvents, in addition to acting as a diluent, are believed to prevent ionic interaction between adjacent metallated polymer molecules. The polar solvents also accelerate subsequent graft polymerization reactions. Nonpolar solvents may be used if desired.

Satisfactory results have been obtained when the viscosity modifying amount is greater than about ten percent by volume of all solvents in the mixture. Lesser amounts may be used if the mixture viscosity is sufficiently low. Amounts of twenty percent by volume and greater also produce acceptable results, but are not needed.

Addition of the polar solvent is desirably delayed until after metallation of the ethylene polymer is substantially complete. Those skilled in the art of metallation chemistry recognize that the polar solvents are metallated under conditions whereby the ethylene polymer is metallated. The metallated polar solvent is an undesirable reactant. It also reduces the amount of available metallating reagent, thereby lowering polymer metallation efficiency.

If necessary, the polar solvent may be added before metallation of the ethylene polymer is substantially complete provided no more than a brief time interval elapses before addition of one or more reagents is begun. The length of the time interval varies with completeness of metallation, with metallating components and with reactivity of added reagents. It is, however, readily determined without undue experimentation.

Addition of the polar solvent before metallation is substantially complete, while permitted, does have some adverse side effects. First, too much polar solvent is metallated if addition of the reagents is not started soon enough. As noted herein, the metallated polar solvent is an undesirable contaminant. Second, some of the reagents may be converted to homopolymers or copolymers rather than being grafted onto the ethylene polymer.

Preparation of graft polymers using ethylene polymers in the form of a slurry may be accomplished either by duplicating the procedure set forth herein for ethylene polymers in the form of a homogeneous mixture or by following a modified procedure. The modified procedure is the same as the former procedure through metallation of the ethylene polymer. After metallation is substantially complete, the solvent and metallation reagents are easily decanted, or filtered, from the metallated polymer. The metallated polymer is then reslurried with fresh solvent.

Reslurrying the metallated polymer in fresh solvent removes substantially all of the metallation reagents. Accordingly, the fresh solvent need not be the same as that used in metallation and solvents not previously suitable may be used. The solvent must, however, be substantially nonreactive with the metallated polymer. Illustrative additional solvents include saturated aliphatic solvents and aromatic solvents.

Polar solvents, particularly suitable for preparing graft polymers in solution, are not required when preparing graft polymers in slurry. When the metallated polymer is in the form of a slurry, it is actually a dispersion of discrete particles and ionic interaction, if present, is believed to be minimal and of no consequence. Although not needed for purposes of dilution or preventing ionic interaction, polar solvents may still be used to accelerate subsequent grafting.

Reagents used in preparing a graft polymer must have sufficient electrophilic character to react with the nucleophilic metallated ethylene polymer. Anionically polymerizable monomers having sufficient electrophilic character include, but are not limited to vinyl aromatic comounds such as styrene, alpha-methyl styrene and vinyl toluene and its isomers; vinyl unsaturated amides such as acrylamide, methacrylamide; N,N-dilower alkyl acrylamides, e.g., N,N-dimethylacrylamide; acenapthalene; 9-acrylcarbazole; acrylonitrile and methacrylonitrile; organic isocyanates including lower alkyl, phenyl, lower alkyl phenyl and halophenyl isocyanates; organic diisocyanates including lower alkylene, phenylene and tolylene diisocyanates; lower alkyl acrylates and methacrylates, including methyl and t-butyl acrylates and methacrylates; lower olefins, such as ethylene, propylene, butylene, isobutylene, pentene, hexene, etc.; vinyl esters of aliphatic carboxylic acids such as vinyl acetate, vinyl propionate, vinyl octoate, vinyl aleate, vinyl stearate, vinyl benzoate; vinyl lower alkyl ethers; vinyl pyridines; vinyl pyrrolidones; dienes including isoprene and butadiene; and lower alkylene oxides. The term "lower" is used above to denote organic groups containing eight or fewer carbon atoms.

Other anionically polymerizable monomers are disclosed in *Macromolecular Reviews*, Volume 2, pages 74–83, Interscience Publishers, Inc. (1967), entitled "Monomers Polymerized by Anionic Initiators". Still other monomers are disclosed in *Anionic Polymerization*, ACS Symposium Series 166, page 60, American Chemical Society (1981). The teachings of these references are incorporated herein by reference. Additional monomers disclosed in these publications include vinylnaphthalenes, alkyl methacrylates wherein the alkyl group has up to eighteen carbon atoms, lactones and thiiranes. Suitable monomers not disclosed in either publication include lactams such as caprolactam.

By suitable choice of monomer(s), it is possible to prepare pendant polymer chains having desired polymer properties. The pendant polymer chains may modify the ethylene polymer sufficiently to render it compatible or covulcanizable with a corresponding variety of polymers which are derived entirely, or predominantly, from the monomer(s) in the pendant chains. Graft polymers prepared by reacting one or more monomers with the metallated ethylene polymer typically have pendant polymer chains which comprise from about 10 to about 60, desirably from about 20 to about 40, percent by weight of the graft polymer.

Certain of the graft copolymers prepared in accordance with the present invention and comprising an ethylene polymer backbone with at least two pendant styrene polymer chains exhibit thermoplastic elastomer properties provided certain conditions are met. One condition is that the pendant styrene polymer chains have a number average molecular weight which is suitably from about 500 to about 100,000, beneficially from about 2000 to about 30,000 and desirably from about 5000 to about 15,000. A second condition is that total styrene polymer content is suitably from about 10 to about 60, beneficially from about 15 to about 40, percent by weight of polymer.

Graft polymerization reactions of the present invention are typically conducted at a temperature of −10° Centigrade or higher. A useful maximum temperature is 60° Centigrade. A desirable temperature range is from about 30° to about 50° Centigrade. The grafting reaction is preferably started at a temperature within a range of from about 10° to about 30° Centigrade. The reaction is exothermic and will generate sufficient additional heat to cause the reaction to run at, for example, up to 20° Centigrade higher unless external cooling is applied to remove the additional heat.

One class of thermoplastic elastomers, known generically as triblock copolymers, generally comprise two styrene polymer end blocks attached to a central polydiene block. Maurice Morton of the University of Akron observes, in Volume 15, *Encyclopedia of Polymer Science and TEchnology* (1971) at page 514, that, in order to obtain optimum mechanical properties in styrene-diene-styrene block copolymers, "the polystyrene blocks must be in the range of 10,000–20,000 molecular weight whereas the polydiene block should have a molecular weight between 40,000 and 100,000." In addition, "the total polystyrene content should be between 20 and 40 wt. %". "[T]he lower limit of molecular weight is governed by minimum polystyrene chain length required for formation of heterogeneous domains while the upper limit is set by viscosity considerations which can seriously hamper good separation of these domains."

Diblock polymers generally have much lower tensile strengths than analogous triblock polymers. For example, a typical styrene-butadiene diblock polymer has a tensile strength of about 30 pounds per square inch (0.207 megapascals (MPa)) whereas an analogous styrene-butadiene-styrene triblock polymer has a tensile strength of about 3000 pounds per square inch (20.7 MPa). Admixtures of diblock and triblock polymers show decreasing tensile strength values as the proportion of diblock polymer increases. Therefore diblock polymer content should be minimized if tensile strength is to be maximized.

One means of attaining a lower diblock content is to select metallating conditions and reagent ratios which increase the number of polymer chains having at least two pendant polymer chains of appropriate molecular weight.

In order to enhance polymer properties other than tensile strength, a minimum amount of diblock polymer may be necessary. The skilled artisan can readily determine the minimum amount as well as an appropriate balance of conflicting physical properties without undue experimentation.

Thermoplastic elastomer type products are not restricted to grafted ethylene polymers wherein the pendant chains are styrene polymers. Satisfactory results are obtained with other anionically polymerizable monomers described herein, such as methyl methacrylate, which provide heterogeneous domains of adequate molecular weight and hardness. Weights of pendant polymer chains and percentage thereof with respect to total graft polymer weight, are not necessarily the same as specified for styrene polymer pendant chains. They are, however, readily determined without undue experimentation.

The metallated ethylene polymers of the present invention are generally nucleophilic, and may be so nucleophilic that they must be reacted with a modifying compound before being used to prepare graft polymers from certain monomers. The modifying compound is believed to serve one of two purposes. One is to direct the attack on reagents or monomers at a preferred site when the anionically polymerizable monomer (electrophilic reagent) to be grafted has two or more reactive sites, as in the case of alkyl esters of methacrylic acid, and is strongly electrophilic as compared to the metallated polymer. A second purpose is to minimize termination reactions in favor of polymerization. For example, alkyl esters of methacrylic acid, unless modified in accordance with the present invention, terminate rapidly when added to the metallated polymer. By minimizing terminations, pendant polymer chains of desirably lengths and molecular weight are more readily obtained. The modifying compound is believed to be incorporated into the graft polymer without adverse effect. Similar results are obtained by modifying metallated polymers produced by other processes such as those described by Duck et al. or Halasa et al.

Monomers having two or more reactive sites include alkyl esters of alpha, beta-ethylenically unsaturated carboxylic acids. The monomer or reagent is beneficially an alkyl ester of acrylic acid or methacrylic acid. The reagent is desirably an alkyl ester of methacrylic acid such as adamantyl methacrylate, benzyl methacrylate, butyl methacrylate, sec-butyl methacrylate, tert-butyl methacrylate, cyclohexyl methacrylate, decyl methacrylate, dodecyl methacrylate, 2-ethylhexyl methacrylate, ethyl methacrylate, hexadecyl methacrylate, hexyl methacrylate, isobutyl methacrylate, isopropyl methacrylate, 3,5-dimethyladamantyl methacrylate, 3,3-dimethylbutyl methacrylate, 3,3-dimethyl-2-butyl methacrylate, 3,5,5-trimethylhexyl methacrylate, methyl methacrylate, octadecyl methacrylate, octyl methacrylate, pentyl methacrylate, phenethyl methacrylate, phenyl methacrylate, propyl methacrylate and tetradecyl methacrylate. The reagent is preferably methyl methacrylate, butyl methacrylate or tert-butyl methacrylate. Other suitable methacrylates include diethylaminoethyl methacrylate, 2-N-tert-butylaminoethyl methacrylate, 1H,1H-heptafluorobutyl methacrylate, 1H,1H,7H-dodecafluoroheptyl methacrylate, 1H,1H,9H-hexadecafluorononyl methacrylate, 1H,1H,5H-octafluoropentyl methacrylate, 1,1,1-trifluoro-2-propyl methacrylate, isobornyl methacrylate, 4-methoxycarbonylphenyl methacrylate, dimethylaminoethyl methacrylate, and 3-oxabutyl methacrylate.

The modifying compound is beneficially added to a homogeneous mixture of a metallated polymer after addition of the polar solvent. The solvent facilitates addition of the modifying compound and acids in addition of monomers following modification of the metallated polymer. The solvent must be nonreactive with the modifying compound, the metallated polymer and the modified polymer.

The modifying compound is suitably selected from the group consisting of lower alkylene oxides, diphenyl ethylene, alpha-methylstyrene, homologues of alpha-methylstyrene and the like. Homologues of alpha-methylstyrene include alpha-ethylstyrene, alpha-propylstyrene and alpha-isopropylstyrene. Alpha-methylstyrene is preferred because of its availability. Desirable results are obtained when one of those compounds, particularly alpha-methylstyrene and its homologues, is added stoichiometrically with metallated sites on the ethylene polymer. A one-for-one reaction of a modifying compound with each metallated site is neither necessary nor practical, even with stoichiometric amounts of the modifying compound. The modified polymer, like the metallated polymer, functions as an anionic polymerization initiator. In other words, the modified polymer competes with the metallated polymer for the remaining modifying compound. In short, the term "modified polymer", as used herein, means that at least some, desirably at least a major portion, of the metallated sites are modified.

Modification of the metallated ethylene polymer may be accomplished either with or without recovery of the metallated polymer from solvents, metallating reagents and the like used in metallating the polymer.

The term "lower alkylene oxide" is used herein to denote one having eight or fewer carbon atoms. Ethylene oxides and propylene oxides are suitable for purposes of the present invention.

Graft polymers prepared from modified polymers are generally classified as thermoplastic rather than as thermoplastic elastomers. These graft polymers have pendant chains with a number average molecular weight of from about 2000 to about 70,000. The pendant polymer chains comprise from about 10 to about 40 percent by weight based on copolymer weight. In addition, such graft polymers do not have polymerized therein any fulvene or fulvene derivative moieties.

The graft polymers prepared from the modified polymers, particularly those grafted polymers having pendant methyl methacrylate chains, are structurally analogous to polymers such as styrene-ethylene/butylene-styrene block polymers which are used in preparing thermoplastic interpenetrating networks. Poly(methyl methacrylate) and polystyrene have identical solubility parameters, as measured in terms of calories per milliliter. The graft polymers should therefore form thermoplastic interpenetrating networks when admixed with engineering thermoplastic polymers such as poly(ethylene terephthalate), poly(butylene terephthalate), styrene-maleic anhydride and polyamides, e.g., nylon 6, nylon 4, nylon 11, nylon 12 and nylon 66.

Graft polymers having pendant methyl methacrylate polymer chains and being prepared by the process of the present invention differ from those prepared by a free radical grafting process. The latter process results in a number of crosslinks and consequent hardening of the graft polymer. Hamad et al. (U.S. Pat. No. 3,622,652) is one reference describing such a process.

When the graft polymer pendant chains have reached a desired molecular weight, the reaction may be terminated in the same way other anionic polymerizations are terminated. For example, an alcohol, an acid, or both may be added to terminate polymerization. As a practical matter, many of the graft polymerization reactions will self terminate. In those instances, alcohol, for example, is added to terminate or kill remaining anionic polymerization sites. The polymer is then recovered by conventional means.

Metallated polymers produced as described herein have uses other than preparing the graft polymers described herein. The metallated polymers will react, in the same manner as organo-alkali metal compounds, with a wide variety of reactive chemicals to produce new materials. Five typical reactions are described in succeeding paragraphs.

The metallated polymers can be reacted with carbon dioxide. The reaction product is neutralized with a mineral acid to produce a carboxylated polymer. The degree of carboxylation is dependent upon the amount of metallation.

The metallated polymers can be reacted with alkylene oxides to produce an intermediate. The intermediate is terminated with a compound having a reactive hydrogen to yield hydroxy-functionalized compounds.

The metallated polymer can be used to initiate the polymerization of dienes and certain vinylic compounds. Graft copolymers or homopolymers can thus be prepared by adding lithium-polymerizable monomers to the metallated polymer.

Block copolymers which cannot be produced by any more usual means can be prepared conveniently by using the metallated polymer as a starting material. A suitable co-reactant is a polymer or polymer segment which has a reactive group.

Useful reaction products are prepared by reacting the metallated polymers with compounds such as ketones, aldehydes, esters, nitriles, silicon halides, isocyanates, carboxylic acids and salts, carbon dioxide, acid chlorides, etc.

One particular class of useful products is obtained by reacting fulvene derivatives with metallated ethylene polymers which have not been reacted with a modifying compound such as alpha-methylstyrene. Fulvene derivatives suitable for purposes of the present invention are represented by the general formula wherein $R_1$ and $R_2$ are independently hydrogen or hydrocarbon groups with one to twelve carbon atoms per group. The hydrocarbon groups are aliphatic, alicyclic or aromatic. $R_3$ is an alkyl group of from about one to about four carbon atoms. $R_1$ and $R_2$ may also form a cyclic group. Illustrative fulvene derivatives include fulvene, methylfulvene, dimethylfulvene, ethylfulvene, methyl ethylfulvene, methylpropylfulvene, methylisopropylfulvene, methylamylfulvene, diethylfulvene, dipropylfulvene, phenylfulvene, methylphenylfulvene, diphenylfulvene, styrylfulvene, 6,6-cyclotetramethylene fulvene, 6,6-cyclopentamethylenefulvene, 6,6-cyclotetramethylenefulvene, 6,6-cyclopentamethylenefulvene, 2-methyl-6,6-fulvene, 2-ethyl-6,6-fulvene and 3-methyl-6,6-fulvene. The fulvene derivative is desirably dimethylfulvene.

The fulvene derivatives react very readily with the metallated ethylene polymers of the present invention at a reaction temperature of from about $-80°$ to about 150° Centigrade. The reaction temperature is beneficially from about $-20°$ to about 50° Centigrade and desirably from about 20° to about 50° Centigrade. The reaction time will vary with the reaction temperature, the fulvene derivative, the degree of metallation and the like. Satisfactory results are obtained, for example, with dimethyl fulvene at a reaction temperature of about 25° Centigrade and a reaction time of about one hour.

The polymer obtained by reacting a fulvene derivative with the metallated ethylene polymer has a plurality of pendant cyclopentadienyl lithium groups attached to the ethylene polymer backbone. The cyclopentadienyl lithium groups are readily converted to cyclopentadiene groups by treating the polymer with a compound having an active hydrogen, such as water, alcohols and acids.

The polymer containing a plurality of pendant cyclopentadiene groups is quite reactive. As such, it will undergo Diels-Alder crosslinking in the same manner as monomeric cyclopentadiene.

As noted herein, certain of the graft copolymers prepared in accordance with the present invention exhibit thermoplastic elastomer properties. These properties are enhanced if the pendant polymer chains are reacted with a fulvene derivative rather than terminated with an alcohol or an acid. Those polymer chains which react with the fulvene derivative will also undergo Diels-Alder crosslinking. The pendant polymer chains are believed to act as an extender enhancing the probability that cyclopentadiene moieties will come in contact with each other.

Although this disclosure is directed to metallation of ethylene polymers, the metallating composition can be effectively used with other polymers having varying degrees of unsaturation. Examples of such polymers include butyl rubbers prepared by the interpolymerization of isobutylene and isoprene; polymers of ethylene, higher alpha-olefins, and conjugated dienes such as butadiene, isoprene and the like; polymers prepared by the interpolymerization of diene monomers with lower (1–8 carbon atoms) alkyl acrylate monomers; and polymers prepared by the interpolymerization of diene monomers with vinyl ketones, vinyl esters or vinyl ethers. These metallated polymers can then be used to prepare graft polymers or functionalized polymers in the same manner as disclosed herein with respect to ethylene polymers.

The following examples are for purposes of illustration only and are not to be viewed as limiting the present invention. All parts and percentages are on a weight basis unless otherwise indicated. Examples of the present invention are indicated in Arabic numerals while comparative examples are indicated by capital alphabetic letters.

Apparatus Description

Reactions were run in one of four apparatus. The apparatus differed primarily in size or capacity and secondarily in terms of components or materials of construction. Notwithstanding such differences, the reactions conducted therein followed a single reaction procedure unless otherwise specified.

The first apparatus, hereinafter "500 Milliliter Reactor", was set up in a dry box under a gaseous nitrogen atmosphere. The apparatus was assembled from glassware which had been washed and then dried for at least four hours at a temperature of about 120° Centigrade. A 500 milliliter capacity Tall Form TM beaker was normally used as a reaction vessel. In some instances, the reaction vessel was a 500 milliliter capacity Fleaker TM. Both vessels were commercially available from Corning Glass Works. Solutions added to the vessels were agitated using a variable speed, motor-driven, stainless steel stirrer. A slinging disk deflection plate was disposed on the stirrer to preclude reaction product from exiting the vessel by climbing the stirrer when the Tall Form TM beaker was used as the reaction vessel. The stirrer motor had an operating range of 40–315 revolutions per minute (from about 4.2 to about 33 radians per second).

The second apparatus, hereinafter "600 Milliliter Reactor", was identical to the first apparatus except that the vessel was a 600 milliliter capacity beaker commercially available from Corning Glass Works.

The third apparatus, hereinafter "Three Liter Reactor", was based upon a 3000 milliliter capacity, O-ring sealed, glass kettle body, commercially available from Lab Glass Inc. under the trade designation LG-8075. The kettle body was mated with a thick-walled cover having four ground glass openings, one in the center and three spaced equally near the periphery thereof. The top was commercially available from Curtin-Matheson Scientific, Inc. under the trade designation Pyrex TM 6947. A multiple-blade turbine agitator equipped with a slinging disk deflection plate was fitted into the center opening. The agitator blades were pitched at an angle of 45°. The agitator was driven by a motor having an operating range of from 14 to 150 revolutions per minute (1.47 to 15.71 radians per second). A gaseous nitrogen source connected to a bubbler and to one of the peripheral openings was used to establish a gaseous nitrogen atmosphere in the apparatus. A second peripheral opening was fitted with a rubber septum. The third peripheral opening was fitted with a polytetrafluoroethylene adapter and thermocouple probe.

The fourth apparatus, hereinafter "Five Gallon Reactor", was a jacketed five gallon (18.93 liters) stainless steel autoclave. Solvents and monomers were dispensed from the pressure vessels piped directly to the autoclave. A one quarter inch (0.64 centimeter) ball valve was fitted with a rubber septum for addition of other reagents. The autoclave was equipped with a multiple-blade, motor-driven turbine agitator having a slinging disk deflection plate mounted near the top thereof. The agitator was driven by a motor having an operating range of from about 50 to about 150 revolutions per minute (5.24 to 15.71 radians per second). The agitator blades were pitched at an angle of 45°. A gaseous nitrogen source was connected to the autoclave for the purposes of purging the autoclave of water, air and other impurities and establishing a nitrogen atmosphere therein. The autoclave was also fitted with block valve vents to allow (a) normal depressurization and (b) near atmospheric pressure addition of reagents under a nitrogen purge. In addition, the autoclave was fitted with temperature sensing devices.

General Metallation Procedure

In a typical reaction with the 500 Milliliter Reactor, one hundred milliliters of a stock solution of an EPDM terpolymer in cyclohexane was added to the reactor vessel. The stock solution was diluted to 300 milliliters total volume with cyclohexane. The EPDM terpolymer had a nominal propylene content of about 39 percent of terpolymer weight, a nominal 1,4-hexadiene content of two percent of terpolymer weight and a Mooney viscosity (ML 1+4 at 121° Centigrade) of 20. Nominal diene content was calculated based upon Carbon-13 Nuclear Magnetic Resonance Spectroscopy. The terpolymer had a peak molecular weight, determined by gel permeation chromatography at 135° Centigrade, of 102,067. The terpolymer was commercially available under the trade designation Nordel TM 1320 from E. I. duPont de Nemours & Co.

Metallating reagents were added volumetrically to the stirred stock solution. The metallating reagents were of three types—lithium alkyls, potassium alkoxides, and tertiary diamines. The potassium alkoxides were present as one to two percent solutions in cyclohexane. The lithium alkyls were present as nominal 1.5 to 3 Molar solutions in hexane. The tertiary diamines were undiluted. The potassium alkoxide and the tertiary diamine were added to the stirred solution which was maintained at a temperature of about 30° Centigrade. The lithium alkyl was then added to the stirred solution.

Prior to addition of the lithium alkyl, the stirred solution was clear and colorless. Following addition of the lithium alkyl, the solution usually became cloudy. As metallation proceeded, the cloudiness disappeared and the solution became colored. Typical colors were shades of brown, reddish brown or orange. In some instances, where either a high tertiary diamine to lithium ratio or a highly branched lithium alkyl was used, little or no cloudiness was observed.

Metallation reactions were usually either terminated or reacted with a reagent about one hour after addition of the lithium alkyl to the stirred solution. Gel formation usually occurred before termination. It is believed that gel formation was due to ionic crosslinking. The slinging disk deflector plate kept the gel from climbing the shaft and exiting the reaction vessel.

Metallation reactions using the Three Liter Reactor generally duplicated the procedures detailed hereinafter for the Five Gallon Reactor. The amounts of polymer, solvents, reagents, and the like were increased due to the change in capacity. In addition, the reaction temperature was 25° Centigrade rather than 30° Centigrade. Additional differences are stated, where appropriate, in the examples which follow.

Metallation Reactions using the Five Gallon Reactor differed in several aspects from the procedure detailed for the 500 Milliliter Reactor. First, the ethylene polymer was not added as a stock solution. Rather, the ethylene polymer and the solvent were added separately to the reactor to form a slurry. The slurry was then agitated and heated to a temperature of 70° Centigrade. Heating and agitation were continued for a period of about two hours, or until the polymer was adequately dissolved. The reactor and its contents were then cooled to a temperature of about 25° Centigrade and allowed to stand, without agitation, overnight (about eighteen hours). Second, metallating reagents were added to the reactor via a different technique. Inside a nitrogen-filled dry box, the reagents were volumetrically measured and placed in individual bottles which were then sealed with a rubber septum. The reagents were transferred to the reactor via a stainless steel transfer needle and a small (¼ inch or about 0.64 centimeter) addition port in the reactor. A small overpressure (about three pounds per square inch gauge or 20.68 kilopascals) of gaseous nitrogen was used to force the reagents from the bottles into the reactor. The reactor was then re-sealed. The reactor and its contents were heated to a temperature of 45° Centigrade during reagent addition.

The reactor temperature was reduced to a set point of 30° Centigrade about 45 minutes after addition of the metallating reagents. The actual temperature of the reactor contents was measured fifteen minutes later and found to be 36° Centigrade. Details of analysis, further reactions and product recovery are furnished with examples which used the Five Gallon Reactor.

Determination of Extent of Metallation

Direct measurement of lithium metal content of a metallated polymer is generally recognized as difficult, if not impossible. Accordingly, a number of indirect techniques are used. One technique involves carbonation of the metallated polymer with pure carbon dioxide to produce a derivative polymer which can be isolated and titrated as a carboxylic acid. Another technique, which is used herein, involves reacting the metallated polymer with chlorotrimethylsilane and thereafter determining bound silicon content.

In a nitrogen-filled dry box, a solution of an excess of trimethylchlorosilane in tetrahydrofuran was added to the metallated polymer to provide a pale yellow, silicon-tagged polymer solution. The silicon-tagged polymer solution was removed from the dry box and poured into an equal volume of a stirred 20/80 (volume ratio) hydrochloric acid/propanol solution to form a mixed solution. Water was added to the mixed solution to double the volume thereof. The diluted mixed solution was stirred vigorously and then allowed to stand and separate into two immiscible layers, an upper organic layer and a lower aqueous/alcohol layer. The organic layer was poured into isopropanol to precipitate the silicon-tagged polymer out of solution. The polymer was separated from the solution by filtration, washed with propanol, separated once again by filtration and then dried in a vacuum oven at a temperature setting of 60° Centigrade. Drying times varied from as short as four hours to as long as eighteen hours, with the norm being overnight or about sixteen hours.

The dried polymer was compression molded into thin film samples using a heated hydraulic press equipped with a six and one-half inch (16.51 centimeter) diameter ram. A sample of the polymer was pressed between two fluorinated polymer film sheets without a frame or chase. The press was commercially available from Pasadena Hydraulics Incorporated. The polymer sample and the film sheets were placed in the press and preheated to a temperature of from about 150° to about 190° Centigrade for a period of two minutes. The ram was then activated to place a total force of 25,000 kilograms of force upon the polymer sample. The force was sufficient to form a film sheet having a thickness of from about 1.5 to about 3 mils (0.0381 to about 0.0762 millimeters). The thickness was usually about 2 mils (0.0508 millimeters). The press was then cooled to ambient temperatures to allow deactivation of the ram and removal of the film samples.

The thin film samples were analyzed for silicon atom content using an infrared spectrophotometer commercially available under the trade designation Model 283 from Perkin Elmer Corporation. A twelve minute scan time over a range of from about 4000 to about 200 reciprocal centimeters ($cm^{-1}$) was used for each sample. The extent of metallation was determined by measuring the intensity of the peak at 850 $cm^{-1}$, which represented the Si—$CH_3$ stretch, and the intensity of the peak at 1150 $cm^{-1}$, which represented the C—$CH_3$ stretch. By comparing the former with the latter in a ratio (hereinafter "Absorbance Ratio"), errors due to film thickness were minimized, if not eliminated. By linear regression analysis of a number of Absorbance Ratios versus their measured molar concentration of trimethyl silane radical (hereinafter "$Me_3Si$"), a linear approximation was established whereby a calculated $Me_3Si$ molar concentration (hereinafter "$(Me_3Si)_m$") could be calculated given an Absorbance Ratio. Using hexyltrimethylsilane in unmetallated EPDM (the same EPDM as metallated herein) as a standard, the linear approximation was found to be:

$(Me_3Si)_m = (Absorbence\ Ratio \times 0.11286) + 0.00137.$

Percent Ene Conversion was determined by the following equation:

$$\frac{(Me_3Si)_m \times grams\ of\ EPDM\ in\ stock\ solution}{density\ of\ EPDM \times mM(Diene)} \times 100$$

wherein mM(Diene) =

$$\frac{grams\ of\ EPDM\ in\ stock\ solution \times \frac{percent\ diene\ in\ EPDM}{molecular\ weight\ of\ diene\ in\ EPDM}}{} \times 1000$$

The molecular weight of the diene monomer in Nordel TM 1320 was 0.08215 grams per millimole.

The EPDM terpolymer most frequently used had a nominal propylene content of about 39 percent of terpolymer weight, a nominal 1,4-hexadiene content of two percent of terpolymer weight and a Mooney viscosity (ML 1+4 at 121° Centigrade) of 20. Nominal diene content was calculated based upon Carbon-13 Nuclear Magnetic Resonance Spectroscopy. The terpolymer had a peak molecular weight, as determined by gel permeation chromatography at 135° Centigrade, of 102,067. The terpolymer was commercially available under the trade designation Nordel TM 1320 from E. I. duPont de Nemours & Co.

Determination of Content of Alkyl Ester of Methacrylic Acid Following Grafting After subjecting metallated polymers to graft polymerization conditions, the resultant polymer was recovered, dried and compression molded into thin film samples using the procedure detailed for preparation of thin films containing silicon atoms. The thin film samples were analyzed for polymethylmethacrylate (PMMA) content using an infrared spectrophotometer commercially available under the trade designation Model 283 from Perkin Elmer Corporation. A twelve minute scan time over a range of from about 4000 to about 200 reciprocal centimeters ($cm^{-1}$) was used for each sample. The extent of metallation was determined by measuring the intensity of the peak at 950 $cm^{-1}$, which represented an O—$CH_3$ stretch of the methylmethacrylate, and the intensity of the peak at 1380 $cm^{-1}$, which represented the $CH_2$—$CH_2$ stretch. By comparing the former with the latter in a ratio (hereinafter "Absorbance Ratio"), any errors due to film thickness were minimized, if not eliminated. By linear regression analysis of a number of Absorbance Ratios versus their measured weight percent of PMMA, a linear approximation was established whereby PMMA weight percent could be calculated given the Absorbance Ratio. Using methylmethacrylate homopolymer in unmetallated EPDM (the same EPDM as metallated herein) as a standard, the linear approximation was found to be:

PMMA weight percent=(Absorbance Ratio×50.4)+9.62.

The linear approximation was found to be correct within ± five percent.

Examples 1–5 and Comparative Examples A–U Metallation Results

A number of samples of EPDM (Nordel TM 1320) were metallated as herein described with the 500 Milliliter Reactor using varying amounts of metallating reagents. The reagents used were (a) n-butyllithium as the alkyllithium; (b) potassium-tert-amyloxide as the potassium alkoxide; and (c) TMEDA as the tertiary diamine. The metallated polymers were tagged with a silane compound as described herein, recovered and formed into compression molded films which were analyzed via infrared spectroscopy, also as herein described. Results of the analysis together with calculated percentages of diene double bonds converted (% Ene Conv.) and molar ratios of potassium atoms to lithium atoms (K/Li) and tertiary diamine to lithium atoms (TMEDA/Li) are shown in Table I.

TABLE I

METALLATION RESULTS - COMPARISON OF REAGENT COMBINATIONS

| Example/ Comparative Example | EPDM (grams) | K/Li | TMEDA/Li | Millimoles Added Li | K | TMEDA | % Ene Conv. |
|---|---|---|---|---|---|---|---|
| A | 6.4 | 0.5 | 0.5 | 1.40 | 0.70 | 0.70 | 11.0 |
| B | 6.2 | 0.5 | 1.0 | 1.36 | 0.68 | 1.36 | 11.0 |
| C | 6.4 | 0.5 | 0 | 1.40 | 0.70 | 0.00 | 6.0 |
| 1 | 6.4 | 1.0 | 0.5 | 1.40 | 1.40 | 0.70 | 27.0 |
| 2 | 6.2 | 1.0 | 1.0 | 1.36 | 1.36 | 1.36 | 43.0 |
| D | 6.4 | 1.0 | 0 | 1.40 | 1.40 | 0.00 | 17.0 |
| 3 | 6.4 | 2.0 | 0.5 | 1.40 | 2.81 | 0.70 | 36.0 |
| 4 | 6.2 | 2.0 | 1.0 | 1.36 | 2.72 | 1.36 | 50.0 |
| E | 6.4 | 2.0 | 0 | 1.40 | 2.90 | 0.00 | 18.0 |
| F | 6.4 | 2.8 | 0 | 1.40 | 3.90 | 0.70 | 20.0 |
| G | 6.4 | 3.0 | 0 | 1.40 | 4.30 | 0.00 | 32.0 |
| 5 | 6.4 | 3.0 | 0.5 | 1.40 | 4.30 | 0.70 | 54.0 |
| H | 6.4 | 3.5 | 0 | 1.40 | 4.90 | 0.00 | 39.0 |
| I | 6.4 | 3.9 | 0 | 1.40 | 5.46 | 0.00 | 60.0 |
| J | 6.4 | 4.0 | 0 | 1.40 | 5.80 | 0.00 | 70.0 |
| K | 6.4 | 4.0 | 0.5 | 1.40 | 5.62 | 0.70 | 68.0 |
| L | 6.2 | 4.0 | 1.0 | 1.36 | 5.44 | 1.36 | 67.0 |
| M | 6.4 | 6.7 | 0 | 1.40 | 9.36 | 0.00 | 94.0 |
| N | 6.4 | 6.7 | 0.5 | 1.40 | 9.36 | 0.70 | 84.0 |
| O | 6.4 | 6.7 | 3.4 | 1.40 | 9.36 | 4.68 | 67.0 |
| P | 6.2 | 0 | 0 | 1.36 | 0.00 | 0.00 | 6.0 |
| Q | 6.4 | 0 | 0.5 | 1.40 | 0.00 | 0.80 | 5.0 |
| R | 6.2 | 0 | 1 | 1.36 | 0.00 | 1.36 | 3.0 |
| S | 6.4 | 0 | 2 | 1.40 | 0.00 | 2.90 | 6.0 |
| T | 6.4 | 0 | 4 | 1.40 | 0.00 | 5.80 | 2.0 |

TABLE I-continued

METALLATION RESULTS - COMPARISON OF REAGENT COMBINATIONS

| Example/<br>Comparative Example | EPDM<br>(grams) | K/Li | TMEDA/Li | Millimoles Added | | | % Ene<br>Conv. |
|---|---|---|---|---|---|---|---|
| | | | | Li | K | TMEDA | |
| U | 6.4 | 0 | 7.25 | 1.40 | 0.00 | 10.19 | 4.0 |

Figure 1:
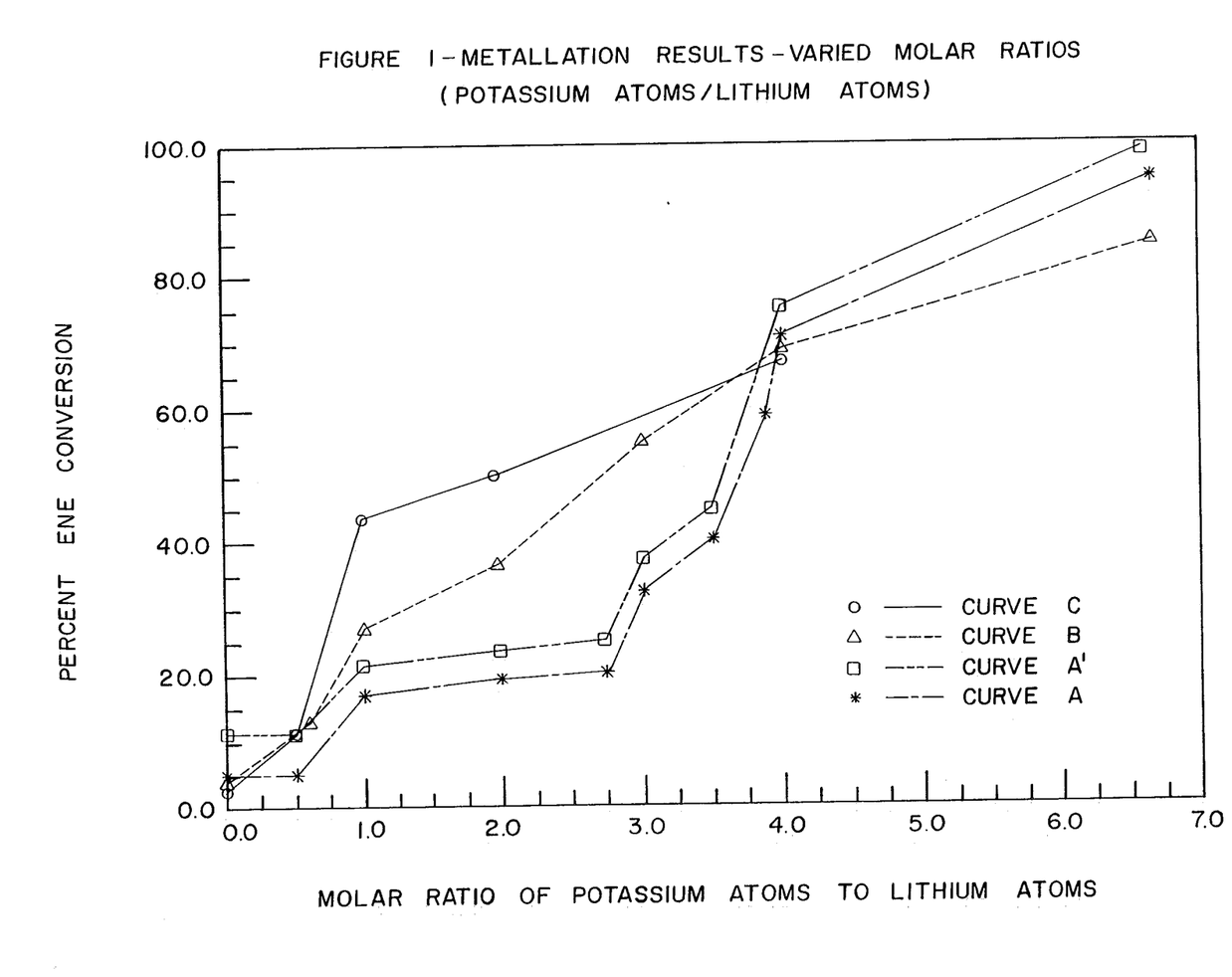
Figure 2:
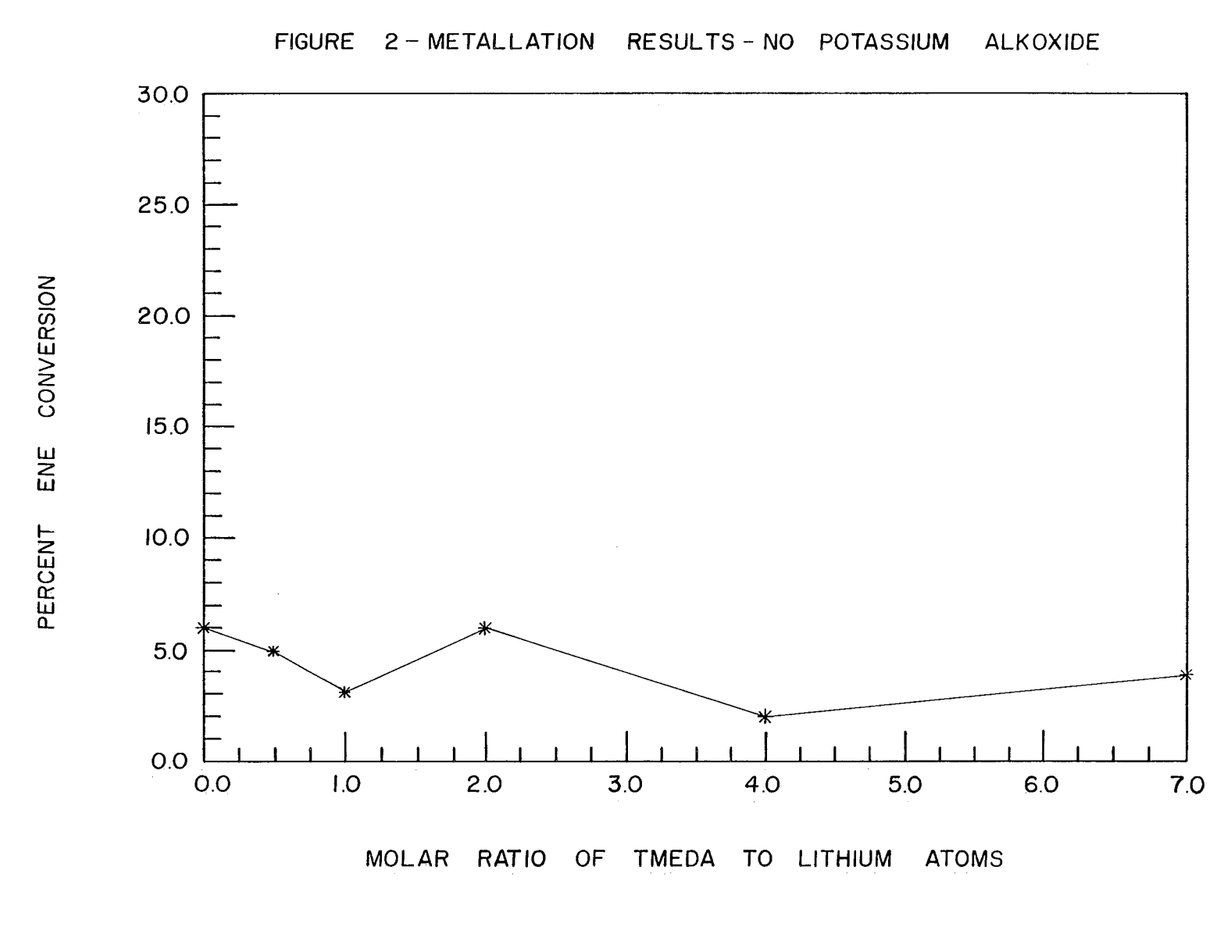

The data presented in Table I and graphically portrayed in FIGS. 1 and 2 support several conclusions. First, an alkyllithium compound, either alone (Comparative Example P) or in combination with a tertiary diamine (Comparative Examples Q-U) is a relatively inefficient metallating composition at the levels used herein. Second, the combination of an alkyllithium compound, a tertiary diamine and a potassium alkoxide exceeds (Examples 1-5) in terms of ene conversion, effectiveness of the two component combination of alkyllithium compound and potassium alkoxide (Comparative Examples C-J & M) at ratios of the latter to the former of less than about 6.7. Third, the three component combination of Examples 1-5 exceeds the additive effects of (a) a tertiary diamine and an alkyllithium compound and (b) a potassium alkoxide an an alkyllithium compound (Example 1 versus Comparative Examples D and Q or Comparative Examples B and C as well as Example 2 versus Comparative Examples D and R). Fourth, at ratios of potassium alkoxide to alkyllithium compound of greater than about 6.7, the addition of a tertiary diamine actually reduces ene conversion percentage. In other words, within a specific range of component ratios, the three component metallation system of the present invention is more effective than combinations of two of the three components. Similar results are obtained with other metallating reagents and ethylene polymers, all of which are defined herein.

Examples 6-9 and Comparative Example V—Preparation of Graft Polymers from Metallated Ethylene Polymers Samples of the same EPDM as used in Examples 1-5 were metallated in the Three Liter Reactor using the equipment and procedures detailed herein. Tetrahydrofuran, in an amount of ten percent by volume, was added to the solution with stirring to break up gel formation and yield a stirrable solution. Styrene monomer was added dropwise over a period of about five minutes to the dilute solution while the latter was stirred. A dark red color, characteristic of a styryl anion was observed. Stirring was continued for an additional two hours. In two instances (Examples 7 and 9), the reaction was terminated and the product thereof recovered as hereinafter detailed. In two other instances (Examples 6 and 8), an amount of dimethylfulvene was added to the stirred solution. Stirring was continued for about one hour after which the reaction was terminated and a reaction product was recovered using the same procedures as with the product of Examples 7 and 9. In Example 6, the amount of dimethylfulvene was 11.62 millimoles. In Example 8, the amount was 7.01 millimoles. During reaction of the dimethylfulvene, the solution changed from the dark red color to white.

The reactions were terminated by adding a 20/80 (volume ratio) hydrochloric acid/isopropanol solution the stirred solution. The solution which contained a reaction product was recovered in a two step process. First, the solution was poured into an equal volume of propanol to coagulate the reaction product out of solution. Second, the reaction product was mixed with acetone, stirred for about one hour, recovered by filtration and then dried in a vacuum oven at a temperature setting of 60° Centigrade. Drying times were the same as those used in recovering the silicon-tagged polymer.

Analysis/Physical Property Testing of Fulvenylated Polymers Composition

The graft polymers, with and without fulvene incorporation, were prepared and analyzed for polystyrene content using a modified version of the procedures herein described for preparing and analyzing silicon-tagged polymers. Film samples having a polystyrene content showed relatively interference-free peaks at 1948 and 1601 cm$^{-1}$. Molar concentration of polystyrene was determined by application of Beer's Law using one peak and the appropriate extinction coefficient. The extinction coefficients were $2.17 \times 10^4$ liters-moles$^{-1}$-cm$^{-1}$ (1601 cm$^{-1}$ peak) and $0.45 \times 10^4$ liters-moles$^{-1}$-cm$^{-1}$ (1948 cm$^{-1}$ peak). Film thickness was measured to the nearest 0.0002 centimeter (cm). Weight percent of polystyrene was calculated by iterative calculation which assumed that the density of the graft polymer was a linear interpolation of the density of the base ethylene polymer and the density of the homopolymer which formed the pendant graft.

Tensile Testing

The graft polymers of Examples 6-9 were fused and fluxed on a heated (175° Centigrade) two roll mill for two to three minutes until a visually uniform sheet was obtained. The sheet was cut, removed from the mill and fit, as a single sheet, into a 10.2 × 10.2 × 0.318 centimeter steel chase. The base ethylene polymer (Comparative Example V) was not roll milled. Instead, shavings of the base polymer were placed in the chase. Press polished sample blanks were formed by compression molding using the previously described hydraulic press, heated to a temperature of 190° C., and the following schedule: (a) preheat four minutes at 1500 kilograms (kg); (b) press two minutes at 25,000 kg; and (c) cool at a rate of fifteen degrees Centigrade per minute to ambient temperature while maintaining a total force of 25,000 kg. Tensile Testing was done using the general procedures of American Society for Testing and Materials (ASTM) Test D-412-82, with samples having a thickness of about 0.318 cm and being cut from the sample blanks with a type "C" die, and a crossarm separation speed of 25.4 centimeters per minute. Shore A Hardness and tensile test results, in terms of Tensile Strength at Break and Percent Elongation, are shown in Table II.

TABLE II

PHYSICAL PROPERTY TEST RESULTS - GRAFT POLYMERS

| Example/Comparative Example | Reacted with dimethyl fulvene | Li/ene Ratio | Percent Poly-Styrene | Hardness Shore A | Tensile Strength at Break (MPa) | Percent Elongation |
|---|---|---|---|---|---|---|
| 6 | Yes | 1.1 | 27 | 83 | 17.86 | 1100 |
| 7 | No | 1.1 | 28 | 81 | 13.76 | 975 |
| 8 | Yes | 0.6 | 26 | 73 | 4.27 | 725 |
| 9 | No | 0.6 | 29 | 75 | 2.71 | 350 |
| V | — | — | 0 | — | 0.18 | 650 |

*non-metallated EPDM
— not applicable

The data presented in Table II illustrates two points. First, it is possible to prepare graft polymers having thermoplastic elastomer properties (Examples 7 and 9). Second, it is possible to enhance the thermoplastic elastomer properties of the graft polymers by fulvenylation thereof. Similar results are obtained with other metallating reagents, ethylene polymers, polymerizable monomers and fulvene derivatives, all of which are defined herein.

Example 10—Study of Effect of Lithium Alkyl Structure Upon Metallation

A number of samples of a different EPDM terpolymer than that of Examples 1–6 were metallated in the 500 Milliliter Reactor. The procedure described herein under the heading "General Metallation Procedure" was modified as follows: (a) the tertiary diamine was omitted; (b) fifty milliliters of stock solution containing 2.5 grams of EPDM were used rather than one hundred milliliters; and (c) the stock solution was diluted to 200 milliliters total volume rather than 300 milliliters. The alkyllithium compound was varied from sample to sample. The ratio of potassium atoms to lithium atoms was 0.93. The EPDM terpolymer had a nominal 1,4-hexadiene diene content of 1.7 percent of terpolymer weight and a Mooney viscosity (ML 1+4 at 121° Centigrade) of 40. The terpolymer was commercially available under the trade designation Nordel TM 1040 from E. I. duPont de Nemours & Co. The extent of metallation was determined as herein described using a different set of constants to determine $(Me_3Si)_m$ because of the change in polymer. With the new constants $(Me_3Si)_m$ = Absorbance Ratio × 0.10774242 + 0.00016955. Identity of the alkyllithium compounds together with calculated percentages of diene double bonds converted (% Ene Converted) are shown in Table III. The ratio of lithium atoms added per diene double bond was 2.71 for each sample.

pounds, such as neopentyllithium, metallate ethylene polymers more effectively than generally linear alkyllithium compounds such as n-butyllithium. Although no tertiary diamine was used during this study, similar results are expected when the tertiary diamine is included as in Example 1.

Example 11—Metallation of Ethylene-Diene Copolymer With Cyclohexane as the Solvent An ethylene-diene copolymer having a nominal 1,4-hexadiene content of 2.5 percent, a melt index of 2.5 decigrams per minute and a number average molecular weight of 13,090 was metallated in the 500 Milliliter Reactor. Ten grams of the copolymer were refluxed in 300 milliliters of cyclohexane for ten minutes and then cooled to ambient temperature. A sufficient amount of cyclohexane was added to bring the volume back to 300 milliliters. Metallating reagents were added to the solution in the order stated as follows: (a) 1.0 milliliters (6.65 millimoles) of TMEDA; (b) 2.8 milliliters (3.36 millimoles) of 1.2 molar potassium-tertamyloxide; and (c) 1.3 milliliters (3.38 millimoles) of 2.6 molar n-butyllithium. The solution was stirred and maintained at a constant temperature of 30° Centigrade throughout metallation.

One hour after addition of the metallating reagents, 3.0 milliliters of tetrahydrofuran were added to the solution. After addition of the tetrahydrofuran, 2.3 milliliters (9.06 millimoles) of 3.94 Molar chlorotrimethylsilane (in tetrahydrofuran) were added to the solution to provide a silicon-tagged polymer solution.

Twenty milliliters of acidified propanol were added to the silicon-tagged polymer solution to terminate reaction thereof. The tagged polymer was then separated from the solution, washed first with propanol and then with water, separated by filtration and dried overnight in a vacuum oven at a temperature of 60° Centigrade.

TABLE III

METALLATION RESULTS - COMPARISON OF ALKYLLITHIUM COMPOUNDS

| Sample Identification | % Ene Conv. | Alkyllithium Compound(s) |
|---|---|---|
| a | 11.7 | n-butyllithium |
| b | 11.7 | n-hexyllithium |
| c | 14.5 | sec-butyllithium |
| d | 18.0 | 3:1 blend** of 3,3-dimethylbutyllithium & n-butyllithium |
| e | 19.1 | isoamyllithium |
| f | 22.4 | 1:1.5 blend** of 3,3-dimethylbutyllithium & 3,3-dimethylpentyllithium |
| g | 26.5 | 3,3-dimethylpentyllithium |
| h | 30.6 | 1:1 blend** of menthyllithium & n-butyllithium |
| j | 40.9 | 2:1 blend** of menthyllithium & n-butyllithium |
| j* | 46.3 | 4:1 blend** of menthyllithium & n-butyllithium |
| k | 50.9 | neopentyllithium |

*metallation conducted at 23° Centigrade rather than 30° Centigrade
**The ratios are molar ratios The data presented in Table III demonstrates that, other things being equal, branched alkyllithium com- The tagged polymer was pressed into a film using the procedure set forth herein and a temperature of 185° Centigrade. The film was analyzed for silicon atom content by infrared spectroscopy as herein specified. Percent Ene Conversion was calculated using absolute calibration of the formula $y=1.86x$ wherein $y=$ moles per liter of silicon and $x=$ absorbence at 850 cm$^{-1}$ per 0.001 inch (0.0254 millimeter) of thickness. Percent Ene Conversion was 12.8 percent.

Example 12—Metallation of Ethylene-Diene Copolymer With Heptane as the Solvent With four exceptions, the procedure of Example 11 was duplicated. One exception was the replacement of cyclohexane with heptane. A second exception was the temperature at which the copolymer was refluxed in the solvent because heptane boils at a higher temperature than cyclohexane. A third exception was based upon visual observation of the polymer particles before reflux, immediately after reflux and after cooling. With each of the solvents, the polymer particles appeared to swell, or increase in size while being refluxed and to decrease somewhat in size with cooling. A greater amount of swelling was retained after cooling with heptane as the solvent rather than cyclohexane. A fourth exception was the use of acetone rather than water as a second wash solution. Percent Ene Conversion was calculated to be 23.5 percent.

Examples 11 and 12 demonstrate that an ethylenediene copolymer can be metallated. It should be noted that the copolymer is generally crystalline whereas the EPDM polymers are generally rubbery. These examples also show that the extent of metallation varies according to the temperature at which metallation is conducted. In other words, the extent of metallation generally increases with increasing temperature provided sufficient swelling of the polymer particles occurs and polymer particle integrity is retained.

Example 13—Grafting Polystyrene onto Ethylene-Diene Copolymer

The procedure used in Example 11 was modified in two aspects. First, the copolymer was initially heated to reflux in heptane then cooled to ambient temperature. The solvent was separated from the copolymer, dispersed in cyclohexane, separated a second time, and finally dispersed a second time in cyclohexane. Second, metallation was continued for 50 minutes rather than one hour. After metallation, three milliliters of tetrahydrofuran and 5.5 milliliters (5 grams) of styrene were added in the order stated. The temperature increased from 30° Centigrade to 33° Centigrade during reaction of the styrene.

Graft polymerization was terminated by addition of dry ice. The graft polymer was separated from the solvent, washed twice with acetone, twice with n-propanol, separated and dried. The dried graft polymer was pressed into a film using the procedure of Example 16. Analysis of the film by infrared spectroscopy provided a calculated polystyrene content of 10.3 percent.

Example 13, while not optimized, clearly shows that grafting of polystyrene onto an ethylene-diene copolymer is possible. Optimization is attainable without undue experimentation. Similar results are obtained with other metallating reagents, monomers and other reagents which react with the metallated polymer and ethylene copolymers all of which are defined herein.

Example 14—Preparation of Grafted Polymer and Determination of Grafting Frequency The Five Gallon Reactor was used to metallate an EPDM terpolymer and then react the metallated polymer with styrene monomer. Using the general metallation procedure for the Five Gallon Reactor, 15,142 milliliters of cyclohexane solvent and 454 grams the same EPDM terpolymer as used in Examples 1–10 were added to the reactor. Metallating reagents were then added in the order stated: (a) 41.7 milliliters of TMEDA; (b) 115.2 milliliters of a 1.2 Molar solution of potassium-tert-amyloxide in cyclohexane; and (c) 53.2 milliliters of a 2.6 Molar solution of n-butyllithium in hexane. The actual temperature of the reactor contents after addition of metallating reagents was 46° Centigrade. One hour after addition of the metallating reagents, the temperature of the reactor contents was found to be 36° Centigrade.

After the temperature measurement, 266 grams of tetrahydrofuran were added gravimetrically to the reactor (over a period of about five minutes). Five minutes after completing addition of the tetrahydrofuran, 200 milliliters of metallated polymer solution were sampled into a septum-covered bottle and analyzed for extent of metallation via silicon tagging as herein described.

About seventeen minutes after completing addition of the tetrahydrofuran, 245 grams of styrene monomer were added gravimetrically to the reactor contents over a period of eight minutes. The highest temperature measured after styrene addition was 33° Centigrade.

One hour after beginning addition of styrene monomer, twenty milliliters of n-propyl alcohol were added to the reactor contents to terminate polymerization and any metallation reactions not previously terminated. The reactor contents were then then transferred to a ten gallon recovery vessel which contained two gallons of n-propyl alcohol. The vessel was open to the atmosphere. The temperature of the n-propyl alcohol was about 25° Centigrade. Several pieces of dry ice were added to the vessel contents while the latter were agitated.

About ten minutes after the dry ice was added, agitation was stopped and the solid or polymer portion of the vessel contents were allowed to settle. The polymer portion was recovered by filtration and decantation. The wet polymer portion was washed with several liters of n-propanol and then recovered by decantation. The wet polymer was then mixed with acetone and agitated for about one hour. The polymer was manually broken into small particles during washing and agitation to maximize exposed surface area. Agitation was then stopped and the polymer was allowed to settle. A small amount of the liquid was removed and set aside. The remaining liquid was removed by filtration to leave a solid polymer product. The solid polymer product was dried overnight in a vacuum oven at a temperature of 50° to 60° Centigrade.

The set aside portion of liquid was allowed to evaporate. A solid residue remained after evaporation. The solid residue was presumed to be styrene homopolymer and to have about the same molecular weight as segments of polystyrene grafted onto the ethylene polymer backbone.

Percent styrene in the solid polymer product was determined by infrared spectroscopy as herein described and found to be 25.7 percent by weight. The solid residue was analyzed by gel permeation chromatography and found to have a number average molecular weight (Mn) of 7082, a weight average molecular weight (Mw) of 9383 and a ratio of Mw/Mn of 1.32.

If one makes two assumptions, the number of side chains, or graft segments, can readily be estimated. One assumption is that there is a random distribution of polymer side chains each of which has the same molecular weight. The other assumption is that the polymer side chains have the same molecular weights as the polystyrene in the solid residue. Based upon these assumptions, the molar ratio of polystyrene to the original EPDM polymer was calculated to be 4.97. In other words, there were about 5 graft segments per olefin polymer chain.

Example 15—Preparation of Grafted Polymer and Determination of Grafting Efficiency A graft polymer was prepared by generally following the procedure of Example 14 with different amounts of the same components as used in Example 14. The differences are set forth in succeeding paragraphs as appropriate.

Initially 14,006 milliliters of cyclohexane solvent and 280 grams of the same EPDM terpolymer as used in Example 14 were added to the Five Gallon Reactor to prepare a polymer solution. Metallation reagents were added as follows: (a) 10.3 milliliters of TMEDA; (b) 227.3 milliliters of a 1.2 Molar solution of potassium-tert-amyloxide in cyclohexane; and (c) 26.2 milliliters of a 2.6 Molar solution of n-butyllithium in hexane. The actual temperature of the reactor contents after metallation reagent addition was 44° Centigrade.

Fifty minutes after addition of the metallating reagents, the reactor set point temperature was reduced to 30° Centigrade. Ten minutes later the actual temperature of reactor contents was 35° Centigrade. After sampling 200 milliliters of the reactor contents for analysis via silicon-tagging, 248 grams of tetrahydrofuran were added gravimetrically over a period of about five minutes. Fifteen minutes later, 150.8 grams of styrene monomer were added gravimetrically over a period of three minutes. The highest temperature measured after styrene addition was 35° Centigrade. The recovery vessel contained three gallons of n-propyl alcohol rather than two gallons as in Example 14.

Percent styrene in the solid polymer product was 34.5 percent by weight. The solid residue was found to have a number average molecule weight (Mn) of 6590, a weight average molecular weight (Mn) of 9656, and a ratio of Mw/Mn of 1.47. The molar ratio was calculated to be 7.97. The number of graft segments per olefin polymer chain was about eight.

The data presented in Examples 14 and 15 amply illustrate that graft copolymers prepared in accordance with the present invention have at least two pendant styrene polymer chains per ethylene polymer backbone. The pendant chains have a number average molecular weight sufficient to provide the graft polymer with thermoplastic elastomer properties. The data also illustrate the marked effectiveness of the metallating composition of the present invention. Similar results are obtained with other metallating reagents, ethylene polymers and monomers, all of which are disclosed herein.

Example 16—Preparation of Graft Polymer Using Diphenyl Ethylene as a Nucleophilicity Moderator Four hundred milliliters of cyclohexane and 12.2 grams of an ethylene-propylene-diene terpolymer (hereinafter "EPDM") were added to the 600 Milliliter Reactor and stirred to form a homogeneous mixture. Metallating reagents, 0.38 grams (0.25 milliliters) of tetramethylethylenediamine (TMEDA), 0.41 grams (2.71 milliliters) of 1.2 Molar potassium-tert-amylate in cyclohexane and 0.21 grams (1.3 milliliters) of 2.5 Molar n-butyllithium in hexanes were added to the mixture in the order and amounts stated to form a reaction mixture. The reaction mixture was heated to, and maintained at, a temperature of 30° Centigrade for a period of ninety minutes.

After about five minutes of heating, the reaction mixture began to turn red. Further heating darkened the color to deep red. In addition, the reacton mixture thickened to a point where it took on a gel-like consistency and began to climb up the stirring shaft after about thirty-five minutes of heating.

After the ninety minute period, heating was stopped and 80 milliliters (ml) of tetrahydrofuran (THF) was added to the reaction mixture to break up the gel-like consistency. Immediately following addition of the THF, 0.53 gram (0.52 ml) of diphenylethylene (DPE) was added to the diluted reaction mixture. The diluted admixture was allowed to react for five minutes to form a modified reaction mixture.

A mixture of 12.2 grams (12.98 milliliters) of methylmethacrylate (MMA) monomer and 11.52 grams (12.98 milliliters) of THF was added to the modified reaction mixture and allowed to react. As polymerization of the MMA proceeded, the color of the reactor contents changed from dark red to yellow-brown. The polymerizing mixture began to gel as the color changed.

About 30 minutes after adding the mixture of MMA and THF to the modified reaction mixture, polymerization of MMA was terminated by adding 0.18 grams (0.17 milliliters) of acetic acid to the polymerizing mixture.

Sixty-four grams (80 milliliters) of n-propanol were added to the terminated reaction mixture. The contents of the reactor vessel were then heated to a temperature of 60° Centigrade for 15 minutes. Heating was then stopped. The contents of the reactor vessel were filtered while hot through a 200 mesh (75 micrometer) wire screen. The filtrate was collected in a recovery vessel.

The vessel was then covered and the contents were allowed to stand for sixteen hours. The contents settled into a gel layer and a liquid layer. After decanting the liquid layer from the gel layer, 400 milliliters of deionized water were added to the gel layer. The added water caused the gel layer to change to a layer of snow white, tacky material. Most of the water was then removed from the material by decanting.

The partially dry polymer was then immersed in an equal volume (400 mls) of (hot) acetone and heated to a temperature of 56° Centigrade for a period of ten minutes. Methylmethacrylate homopolymer, soluble in hot acetone, was thus removed from the tacky material. After decanting the acetone-homopolymer mixture from the tacky material, the remaining solid was dried in a vacuum oven at a set temperature of 80° Centigrade for a period of about three hours.

After drying, the solid was analyzed for MMA content as detailed herein. The solid had an MMA content of 35 percent by weight of solid.

Comparative Example W—Preparation of Graft Polymer using α-Methyl Styrene (α-MS) as a Nucleophilicity Moderator The procedure of Example 16 was repeated except that 0.35 grams of α-MS was used in place of the DPE. The resulting solid had an MMA content of 33 percent by weight of solid.

Comparative Example X—Preparation of Graft Polymer Without a Nucleophilicity Moderator The procedure of Example 16 was duplicated except for the omission of DPE and α-MS. The resulting solid had an MMA content of less than 8 percent by weight of solid.

A review of Example 16 and Comparative Examples W & X illustrates two points. First, a much greater degree of grafting is obtained when a nucleophilicity moderator is used. Second, α-methylstyrene is as effective as diphenylethylene in terms of enhancing grafting effectiveness. Similar results are expected with other polymers, monomers and the like, examples of which are disclosed herein.

What is claimed is:

1. A process for preparing a graft polymer having an ethylene polymer backbone and a plurality of side chains, the process comprising:
   (a) metallating an ethylene polymer, said polymer having polymerized therein ethylene, a nonconjugated diene and at least one 1-olefin having three or more carbon atoms by a process which comprises:
      (1) providing an admixture of the ethylene polymer and a saturated, nonpolar, hydrocarbon solvent,
      (2) forming an intermixture of the admixture and activating amounts of a tertiary diamine and a potassium alkoxide, and
      (3) contacting the intermixture with an amount of at least one lithium alkyl compound under conditions sufficient to provide more than about twenty percent of the polymer molecules with at least one lithiated site, the amounts of the tertiary diamine, the potassium alkoxide and the lithium alkyl also being sufficient to provide a degree of metallation greater than the degree of metallation attained with (i) the potassium alkoxide and the lithium alkyl compound or (ii) the tertiary diamine and the lithium alkyl compound, or by adding the degrees of metallation attained with (i) and (ii); and
   (b) contacting the metallated ethylene polymer with a reagent selected from the group consisting of compounds having sufficient electrophilic character to react with the metallated ethylene polymer which is nucleophilic.

2. The process of claim 1 further comprising diluting the metallated ethylene polymer with a viscosity-reducing amount of a polar solvent prior to contacting the metallated polymer with a reagent.

3. The process of claim 2 wherein the polar solvent is selected from the group consisting of dimethyl ether, diethyl ether, tetrahydrofuran, 2,5-dimethyl tetrahydrofuran, ethyl methyl ether, ethylene glycol dimethyl ether and diethylene glycol dimethyl ether.

4. The process of claim 2 wherein the polar solvent is selected from the group consisting of tetrahydrofuran, ethylene glycol dimethyl ether and diethylene glycol dimethyl ether.

5. The process of claim 1 wherein the electrophilic compound is selected from the group consisting of carbon dioxide; fulvene derivatives, trisubstituted halosilanes, ethylene oxide, Michler's ketone, benzaldehyde, pyrridine and anionically polymerizable monomers.

6. The process of claim 5 wherein the electrophilic compound is an anionically polymerizable monomer.

7. The process of claim 6 wherein the anionically polymerizable monomer is selected from the group consisting of vinyl aromatic compounds and alkyl esters of alpha, beta-ethylenically unsaturated carboxylic acids.

8. The process of claim 6 wherein the anionically polymerizable monomer is a vinyl aromatic compound selected from the group consisting of styrene, nuclear dimethyl styrene, tert-butylstyrene, bromostyrene, chlorostyrene, and vinyl naphthalene.

9. The process of claim 6 wherein the anionically polymerizable monomer is selected from the group consisting of alkyl esters of acrylic acid and alkyl esters of methacrylic acid.

10. The process of claim 6 wherein the anionically polymerizable monomer is styrene.

11. The process of claim 1 further comprising adding a fulvene derivative to the graft polymer subsequent to reaction of the reagent with the metallated ethylene polymer.

12. The process of claim 11 wherein the fulvene derivative is represented by the general formula wherein $R_1$ and $R_2$ (a) are independently hydrogen or hydrocarbon groups with one to twelve carbon atoms per group, the hydrocarbon groups being aliphatic, alicyclic or aromatic or (b) combine to form a cyclic group, and $R_3$ is an alkyl group of from about one to about four carbon atoms.

13. The process of claim 11 wherein the fulvene derivative is selected from the group consisting of fulvene, methylfulvene, dimethylfulvene, ethylfulvene, methyl ethylfulvene, methylpropylfulvene, methylisopropylfulvene, methylamylfulvene, diethylfulvene, dipropylfulvene, phenylfulvene, methylphenylfulvene, diphenylfulvene, styrylfulvene, 6,6-cyclotetramethylene fulvene, 6,6-cyclopentamethylenefulvene, 6,6-cyclotetramethylene fulvene, 6,6-cyclopentamethylenefulvene, 2-methyl-6,6-fulvene, 2-ethyl-6,6-fulvene and 3-methyl-6,6-fulvene.

14. The process of claim 11 wherein the fulvene derivative is dimethylfulvene.

15. The process of claim 11 wherein the reagent is styrene and the fulvene derivative is dimethylfulvene.

* * * * *

UNITED STATES PATENT AND TRADEMARK OFFICE
CERTIFICATE OF CORRECTION

PATENT NO. : 4,786,689

DATED : November 22, 1988

INVENTOR(S) : Gary K. Lund, et al.

It is certified that error appears in the above-identified patent and that said Letters Patent is hereby corrected as shown below:

Cover sheet, under "Inventors" delete "Gary K. Lund, Ogden, Utah; Raymond L. Laakso, Jr., St. Francisville, La.; Calvin P. Esneault; Brian W. Walther, both of Baton Rouge, La." and insert --Gary K. Lund, Ogden, Utah;Calvin P. Esneault, Baton Rouge, La.; Raymond L. Laakso, Jr., St. Francisville, La.--.

Signed and Sealed this

Eighteenth Day of July, 1989

Attest:

DONALD J. QUIGG

Attesting Officer

Commissioner of Patents and Trademarks